US012236772B2

(12) United States Patent
Alexander et al.

(10) Patent No.: US 12,236,772 B2
(45) Date of Patent: *Feb. 25, 2025

(54) HANDLING DURESS INPUT

(71) Applicant: Alarm.com Incorporated, Tysons, VA (US)

(72) Inventors: Rose Blais Alexander, McLean, VA (US); Rebecca Elisabeth Davenport, Falls Church, VA (US); Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,950

(22) Filed: Nov. 21, 2022

(65) Prior Publication Data

US 2023/0080485 A1 Mar. 16, 2023

Related U.S. Application Data

(63) Continuation of application No. 17/019,826, filed on Sep. 14, 2020, now Pat. No. 11,508,233, which is a continuation of application No. 16/720,784, filed on Dec. 19, 2019, now Pat. No. 10,783,770, which is a continuation of application No. 16/293,056, filed on Mar. 5, 2019, now Pat. No. 10,522,029, which is a continuation of application No. 16/102,284, filed on Aug. 13, 2018, now Pat. No. 10,229,585, which is a continuation of application No. 15/798,141, filed on Oct. 30, 2017, now Pat. No. 10,049,560, which is a continuation of application No. 15/612,660, filed on Jun. 2, 2017, now Pat. No. 9,805,586, which is a continuation of application No. 14/533,203, filed on Nov. 5, 2014, now Pat. No. 9,672,727.

(60) Provisional application No. 61/899,907, filed on Nov. 5, 2013.

(51) Int. Cl.
*G08B 25/01* (2006.01)
*G08B 15/00* (2006.01)
*G08B 25/00* (2006.01)
*G08B 25/14* (2006.01)

(52) U.S. Cl.
CPC ......... *G08B 25/016* (2013.01); *G08B 25/008* (2013.01); *G08B 25/14* (2013.01); *G08B 15/001* (2013.01)

(58) Field of Classification Search
CPC .... G08B 25/016; G08B 25/008; G08B 25/14; G08B 15/001
See application file for complete search history.

(56) References Cited

U.S. PATENT DOCUMENTS

| | | | |
|---|---|---|---|
| 5,400,246 | A | 3/1995 | Wilson et al. |
| 5,959,529 | A | 9/1999 | Kail, IV |
| 9,672,727 | B1 | 6/2017 | Alexander et al. |
| 9,805,586 | B1 | 10/2017 | Alexander et al. |
| 10,049,560 | B1 | 8/2018 | Alexander et al. |
| 10,229,585 | B1 | 3/2019 | Alexander et al. |
| 10,522,029 | B1 | 12/2019 | Alexander et al. |
| 10,783,770 | B1 | 9/2020 | Alexander et al. |

(Continued)

*Primary Examiner* — Daryl C Pope
(74) *Attorney, Agent, or Firm* — Fish & Richardson P.C.

(57) ABSTRACT

Techniques are described for handling duress input. For example, techniques are described for handling duress input provided to a mobile application that controls a monitoring system located at a fixed property.

20 Claims, 5 Drawing Sheets

(56) References Cited

U.S. PATENT DOCUMENTS

| | | | | |
|---|---|---|---|---|
| 11,508,233 | B2 * | 11/2022 | Alexander | G08B 25/016 |
| 2004/0005065 | A1 * | 1/2004 | Griesinger | G01V 1/001 381/17 |
| 2007/0198850 | A1 * | 8/2007 | Martin | G07C 9/257 713/186 |
| 2013/0183924 | A1 | 7/2013 | Saigh et al. | |
| 2018/0198688 | A1 | 7/2018 | Dawes | |
| 2019/0158304 | A1 | 5/2019 | Sundermeyer et al. | |
| 2020/0410845 | A1 | 12/2020 | Alexander et al. | |

* cited by examiner

200

300

| | Duress Input (401) | Location (402) | Date/Time (403) | Property Status (404) | Mobile Device Response (405) | Property Response (406) |
|---|---|---|---|---|---|---|
| 411 | Code 1 | Away From Home | Any | Any | Deny Duress Input; Report Error | Maintain Armed State |
| 412 | Code 1 | At Home | Any | Occupied | Output Acceptance of Duress Input; Alert Spouse and Parent | Disarm; Turn on Lights |
| 413 | Code 1 | At Home | Any | Unccupied | Output Acceptance of Duress Input; Alert Spouse | Disarm; Turn Off Lights; Lock All Z-Wave Doors |
| 414 | Audio Duress | At Home | Any | Any | Monitor Accelerometer; Capture Images and Audio | Capture Images and Audio in Home; Alert In Home |
| 415 | Audio Duress | Away From Home | Any | Any | Monitor Accelerometer; Capture Images and Audio; Report Location | Alert Closest Contact |
| 416 | Z Gesture | Any | Any | Any | Output Acceptance of Duress Input | Activate Siren; Blink Lights On and Off |
| 417 | Code 2 | Any | Mon-Fri | Any | Output Acceptance of Duress Input; Alert Neighbor | Disarm; Adjust Thermostat To Extreme Condition |
| 418 | Code 2 | Any | Sat-Sun | Any | Output Acceptance of Duress Input; Alert Spouse | Disarm; Adjust Thermostat To Extreme Condition |
| 419 | Code 3 | Any | 8AM-8PM | Any | Output Acceptance of Duress Input; Alert Neighbor | Disarm; Activate Neighbor's Alarm |
| 420 | Code 3 | Any | 8PM-8AM | Any | Output Acceptance of Duress Input; Alert Spouse and Parent | Disarm |
| 421 | Code N | Any | Any | Any | Activate Delay Sequence | Delay Disarm In Manner Tied to Delay Sequence |

FIG. 4

HANDLING DURESS INPUT

CROSS REFERENCE TO RELATED APPLICATIONS

This application is a continuation of U.S. application Ser. No. 17/019,826, filed Sep. 14, 2020, which is a continuation of U.S. application Ser. No. 16/720,784, filed Dec. 19, 2019, now U.S. Pat. No. 10,783,770, issued Sep. 22, 2020, which is a continuation of U.S. application Ser. No. 16/293,056, filed Mar. 5, 2019, now U.S. Pat. No. 10,522,029, issued Dec. 31, 2019, which is a continuation of U.S. application Ser. No. 16/102,284, filed Aug. 13, 2018, issued Mar. 12, 2019 as U.S. Pat. No. 10,229,585, which is a continuation of U.S. application Ser. No. 15/798,141, filed Oct. 30, 2017, issued Aug. 14, 2018 as U.S. Pat. No. 10,049,560, which is a continuation of U.S. application Ser. No. 15/612,660, filed Jun. 2, 2017, issued Oct. 31, 2017 as U.S. Pat. No. 9,805,586, which is a continuation of U.S. application Ser. No. 14/533,203, filed Nov. 5, 2014, issued Jun. 6, 2017 as U.S. Pat. No. 9,672,727, which claims the benefit of U.S. Provisional Application No. 61/899,907, filed Nov. 5, 2013, all of which are incorporated herein by reference in their entirety for all purposes.

TECHNICAL FIELD

This disclosure relates to handling duress input.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for handling duress input. For example, techniques are described for handling duress input provided to a mobile application that controls a monitoring system located at a fixed property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 4 illustrates example rules for handling duress input.

DETAILED DESCRIPTION

Figure 1A:
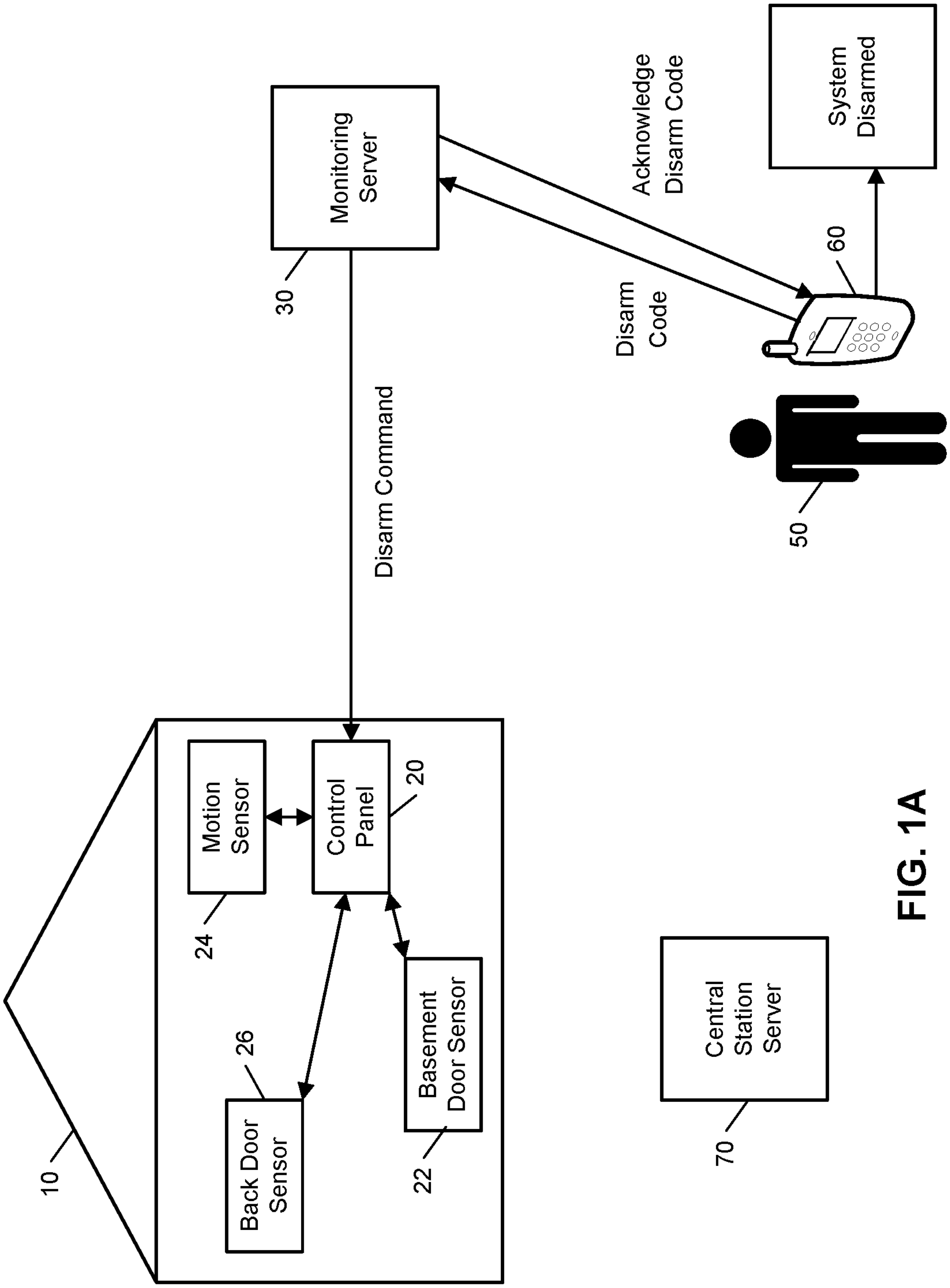
FIGS. 1A and 1B illustrate examples of handling input to disarm a monitoring system.

Techniques are described for handling duress input. In some implementations, a mobile application that resides on a mobile device of a customer controls operation of a monitoring system (e.g., a security system) that is located at a property of the customer. In these implementations, the mobile application enables the customer to control the monitoring system anywhere the customer has communication service with the mobile device and provides the customer with the ability to enable passcode access to the mobile application, which prompts the customer to enter a code (e.g., 4-digit PIN) each time the customer opens the application from his or her mobile device. Pass codes also may be required to perform certain monitoring system control operations, such as disarming the monitoring system. With the ability to disarm the monitoring system through the mobile application and the ability to cancel intrusion alarms through the mobile application, customers could enter distress situations where they want to make it look like they have disarmed their system or canceled an alarm, but also want to send a silent panic alarm to the remote monitoring server and/or central station. For instance, if an intruder were to hold a gun to a customer's head and demanded that the customer disarm his or her security system through the mobile application, the customer could provide a duress code to the mobile application, which gives the appearance that the system has been fully disarmed, but also sends a silent panic alarm to the remote monitoring server and/or central station.

In some examples, users may specify which actions require a passcode (e.g., opening the mobile application, disarming the monitoring system, canceling an intrusion alarm, etc.) and users may have the option to set up one or more duress codes that assist the user with a duress situation without overtly providing an indication that such assistance has been requested. In these examples, any action that requires the application passcode may accept the application duress code, and either code will allow the user to proceed using the application as normal (e.g., there would be no obvious sign that the application duress code was entered compared to the regular application passcode).

In some implementations, the mobile application provides output to let only the user know that the application duress code was entered. For example, during the passcode setup process, the user may specify two background pictures to show within the application, one after the normal passcode was entered and an alternative picture if the application duress code was entered. If the application duress code was entered, the remote monitoring server sends commands to the user's central station for a silent panic alarm. The application duress code also may trigger the mobile application to share the mobile device's location (e.g., global positioning system (GPS) location) with the remote monitoring server (either once or multiple times until the panic alarm has been cleared). Mobile device (e.g., phone) location information may be shared with the central station, emergency responders, and/or family members.

Figure 1B:
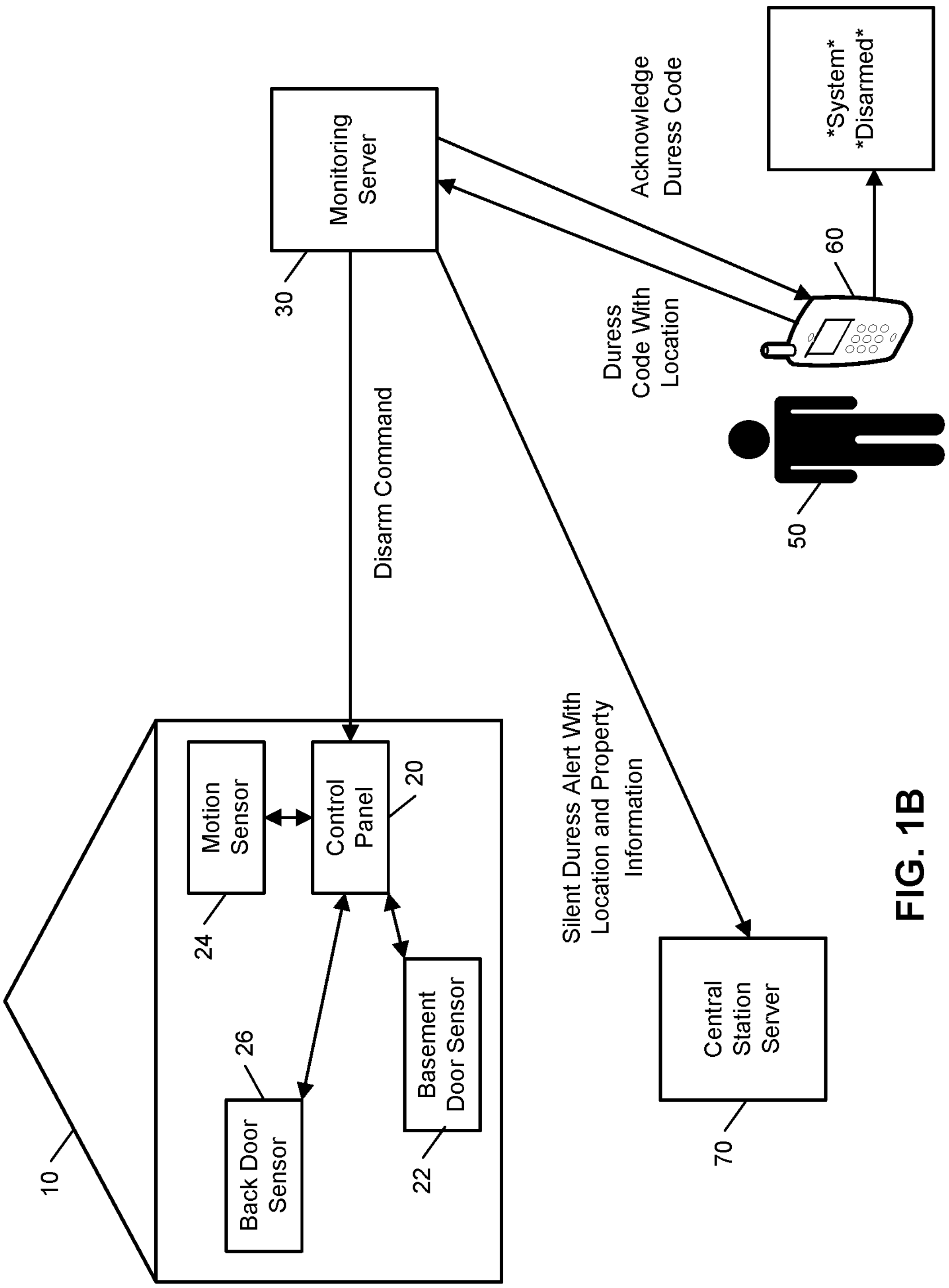

FIGS. 1A and 1B illustrate examples of handling input to disarm a monitoring system with FIG. 1A illustrating an example of normal disarm input being provided at a mobile device and FIG. 1B illustrating an example of duress disarm input being provided at the mobile device. As shown in FIG. 1A, a property 10 (e.g., a home) of a user 50 is monitored by an alarm system (e.g., an in-home security system) that includes components that are fixed within the property 10. The alarm system includes a control panel 20, a basement door sensor 22, a motion sensor 24, and a back door sensor 26. The basement door sensor 22 is a contact sensor positioned at a basement door of the property 10 and configured to sense whether the basement door is in an open position or a closed position. The motion sensor 24 is configured to sense a moving object within the property 10. The back door sensor 26 is a contact sensor positioned at a back door of the property 10 and configured to sense whether the back door is in an open position or a closed position. The alarm system shown in FIG. 1A is merely an example and the alarm system may include more, or fewer, components and different combinations of sensors.

The control panel 20 communicates over a short-range wired or wireless connection with each of the basement door sensor 22, the motion sensor 24, and the back door sensor 26 to receive sensor data descriptive of events detected by the basement door sensor 22, the motion sensor 24, and the back door sensor 26. The control panel 20 also communicates over a long-range wired or wireless connection with a monitoring server 30. The monitoring server 30 is located remote from the property 10 and manages the alarm system at the property 10, as well as other (and, perhaps, many more) alarm systems located at different properties that are owned by different users. The monitoring server 30 receives, from the control panel 20, sensor data descriptive of events detected by the sensors included in the alarm system of the property 10. The monitoring server 30 also detects alarm events at the property 10 based on the received sensor data and provides commands to the control panel 20 to remotely control the alarm system. The monitoring server 30 further communicates with a mobile device 60 (e.g., a smartphone) of the user 50 and a central station server 70. The monitoring server 30 may communicate with the mobile device 60 to provide notifications and status information related to the alarm system and to receive control commands that enable the user 50 to remotely control the alarm system using the mobile device 60. The monitoring server 30 may communicate with the central station server 70 to report that an alarm event detected by the alarm system at the property 10 has been identified as an emergency situation, where the central station server 70 may then dispatch emergency services in response to the report from the monitoring server 30.

In the example shown in FIG. 1A, the user 50 has provided input to the mobile device 60 to disarm the alarm system located at the property 10. In this example, the user 50 has provided input that signifies that the situation in which the disarming of the alarm system is being requested is not a duress situation (e.g., the user 50 has entered a normal disarm passcode or provided gesture and/or biometric input that is used to disarm the alarm system in non-duress situations). Based on receiving the input to disarm the alarm system, the mobile device 60 transmits a disarm code to the monitoring server 30. The disarm code requests the monitoring server 30 to disarm the alarm system and does not indicate that a silent alarm should be triggered for a duress situation. The monitoring server 30 receives the disarm code and sends a disarm command to the control panel 20. The control panel 20 receives the disarm command and disarms the alarm system. The monitoring server 30 also sends, to the mobile device 60, an acknowledgement of receipt and processing of the disarm code. The mobile device 60 receives the acknowledgement of receipt and processing of the disarm code and updates its display screen to shown "System Disarmed."

In the example shown in FIG. 1B, the user 50 has provided input to the mobile device 60 to disarm the alarm system located at the property 10. In this example, unlike the example shown in FIG. 1A, the user 50 has provided input that signifies that the situation in which the disarming of the alarm system is being requested is a duress situation (e.g., the user 50 has entered a duress disarm passcode or provided gesture and/or biometric input that is used to disarm the alarm system in duress situations). Based on receiving the duress input to disarm the alarm system, the mobile device 60 determines a location of the mobile device 60 and transmits, to the monitoring server 30, a duress code with the determined location. The duress code requests the monitoring server 30 to disarm the alarm system and indicates that a silent alarm should be triggered for a duress situation. The monitoring server 30 receives the duress code and sends a disarm command to the control panel 20. The control panel 20 receives the disarm command and disarms the alarm system. The monitoring server 30 also sends, to the mobile device 60, an acknowledgement of receipt and processing of the duress code. The mobile device 60 receives the acknowledgement of receipt and processing of the duress code and updates its display screen to shown "*System* *Disarmed*." The display of "*System* *Disarmed*" in FIG. 1B is different than the display of "System Disarmed" in FIG. 1A to signify, to the user 50 and in an inconspicuous manner, that the duress code has been received and a silent alert for the duress situation is being processed.

The monitoring server 30 further sends, to the central station server 70, a silent duress alert with the determined location of the mobile device 60 received from the mobile device 60 and information related to the property 10 associated with the silent duress alert. The information related to the property 10 associated with the silent duress alert may indicate an address of the property 10 and/or information about a state of the property 10 determined from sensor data captured by the alarm system located at the property 10 (e.g., information indicating whether the property is empty or whether the property has been occupied after disarming of the alarm system). The central station server 70 processes the silent duress alert and may dispatch emergency services to the location of the mobile device 60 and/or the location of the property 10.

Accordingly, as shown by a comparison of FIGS. 1A and 1B, the monitoring server 30 is able to accept and process duress input provided to the mobile device 60 through a mobile application. In this regard, the monitoring server 30 may assist in duress situations of the user 50, regardless of whether the duress situations occur at the property 10 or away from the property 10.

Figure 2:
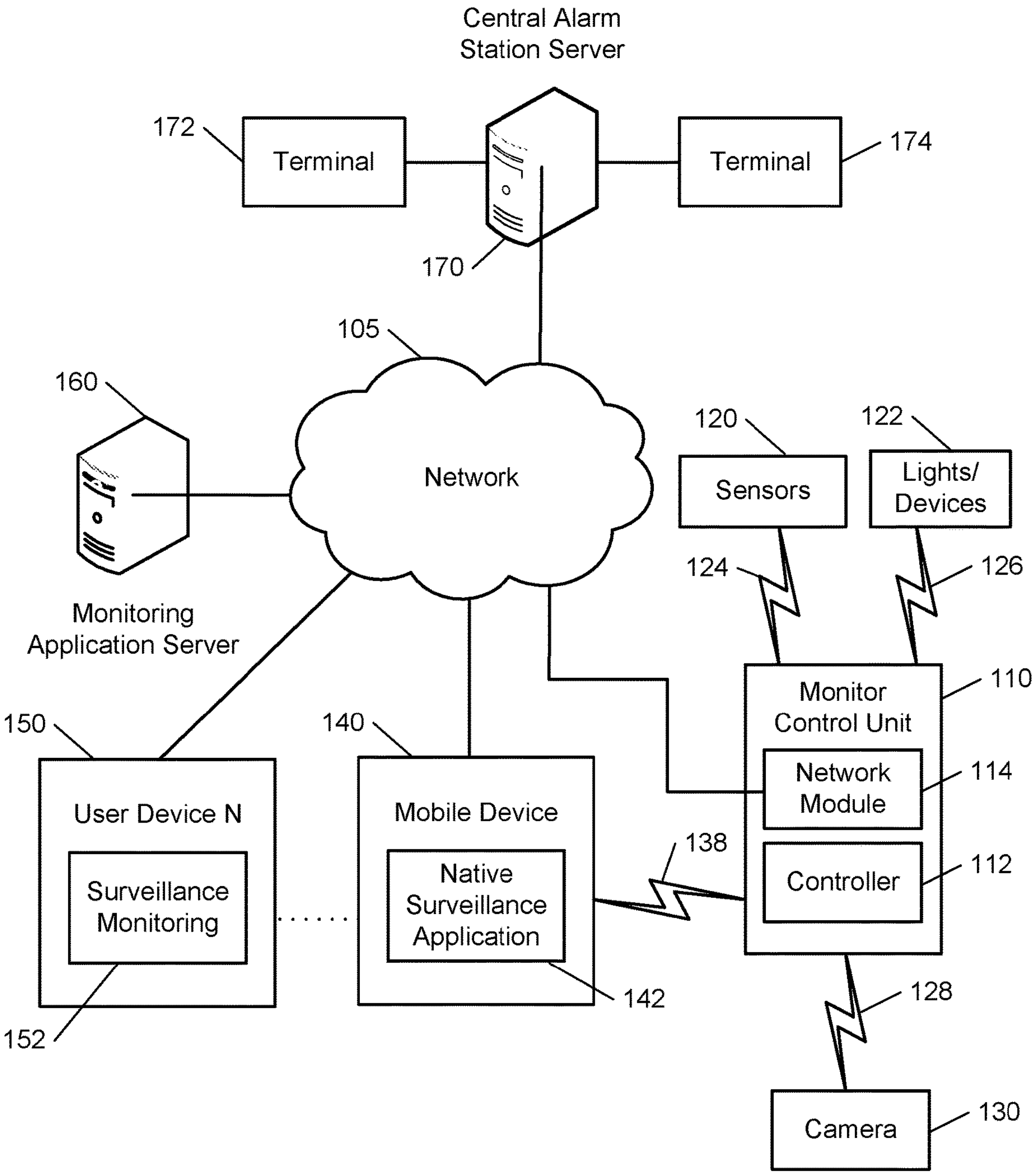
FIG. 2 illustrates an example system.

FIG. 2 illustrates an example of an electronic system 200 configured to provide surveillance, reporting, and handling of duress input. The electronic system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance, monitoring, and/or control operations. The module 122 is connected to one or more lighting systems and/or one or more household devices (e.g., thermostat, oven, range, etc.) and is configured to control operation of the one or more lighting systems and/or the one or more household devices. The module 122 may control the one or more lighting systems and/or the one or more household devices based on commands received from the monitoring system control unit 110. For instance, the module 122 may cause a lighting system to illuminate an area to provide a better image of the area when captured by a camera 130. The module 122 also may control the one or more lighting systems and/or the one or more household devices to perform energy management and/or user convenience operations (e.g., adjusting a temperature setting of a thermostat and turning an oven off and on to meet energy management and user convenience goals).

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a “normally open” or “normally closed” digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled “white” lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system “arming state”, or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may include a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CATS) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 1 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interfaces and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some examples, the system 200 may be used in handling duress input provided through the user devices 140, 150. In these examples, the user devices 140, 150, the monitoring application server 160, and the monitoring system control unit 110 all may be controlled based on duress input being provided through the user devices 140, 150. For instance, in response to receiving duress input, the user devices 140, 150 may send a duress command to the monitoring application server 160 and/or the monitoring system control unit 110, repeatedly report its location to the monitoring application server 160 and/or the monitoring system control unit 110, display an interface that discreetly acknowledges the receipt of the duress input (e.g., by displaying an acknowledgement of input using a different color or different background image), send silent alerts to one or more other users (e.g., other user devices 140, 150 associated with the monitored property), discreetly capture and transmit audio and video of its surroundings to assist in handling the duress situation, and/or discreetly monitor accelerometer data to determine whether violence has occurred in the duress situation.

In addition, the monitoring application server 160 may respond to a duress command received from one of the user devices 140, 150 by taking action that assists with the duress situation. For instance, the monitoring application server 160 may send a command to the monitoring system control unit 110 indicating a duress situation, may send a duress panic alert to the central alarm station server 170, and/or send duress alerts to one or more other users (e.g., other user devices 140, 150 associated with the monitored property). The monitoring system control unit 110 may receive the command indicating the duress situation and take appropriate actions, such as disarming the system and controlling devices in the monitored property in a manner appropriate for a duress situation (e.g., turn on or off lights, change a thermostat setting to an undesirable temperature, lock or unlock doors that have Z-wave locks, discreetly provide a local alert that system was disarmed based on duress input, etc.). Alternatively, the monitoring system control unit 110 may be unaware of the duress situation and the monitoring application server 160 may send commands to the monitoring system control unit 110 to disarm the system and control devices in the monitored property in a manner appropriate for a duress situation.

In some implementations, the user devices 140, 150 send duress input to the monitoring system control unit 110. In these implementations, the monitoring system control unit 110 alerts the monitoring application server 160 to the duress situation and performs operations similar to those described above as being performed by the monitoring application server 160.

Figure 3:
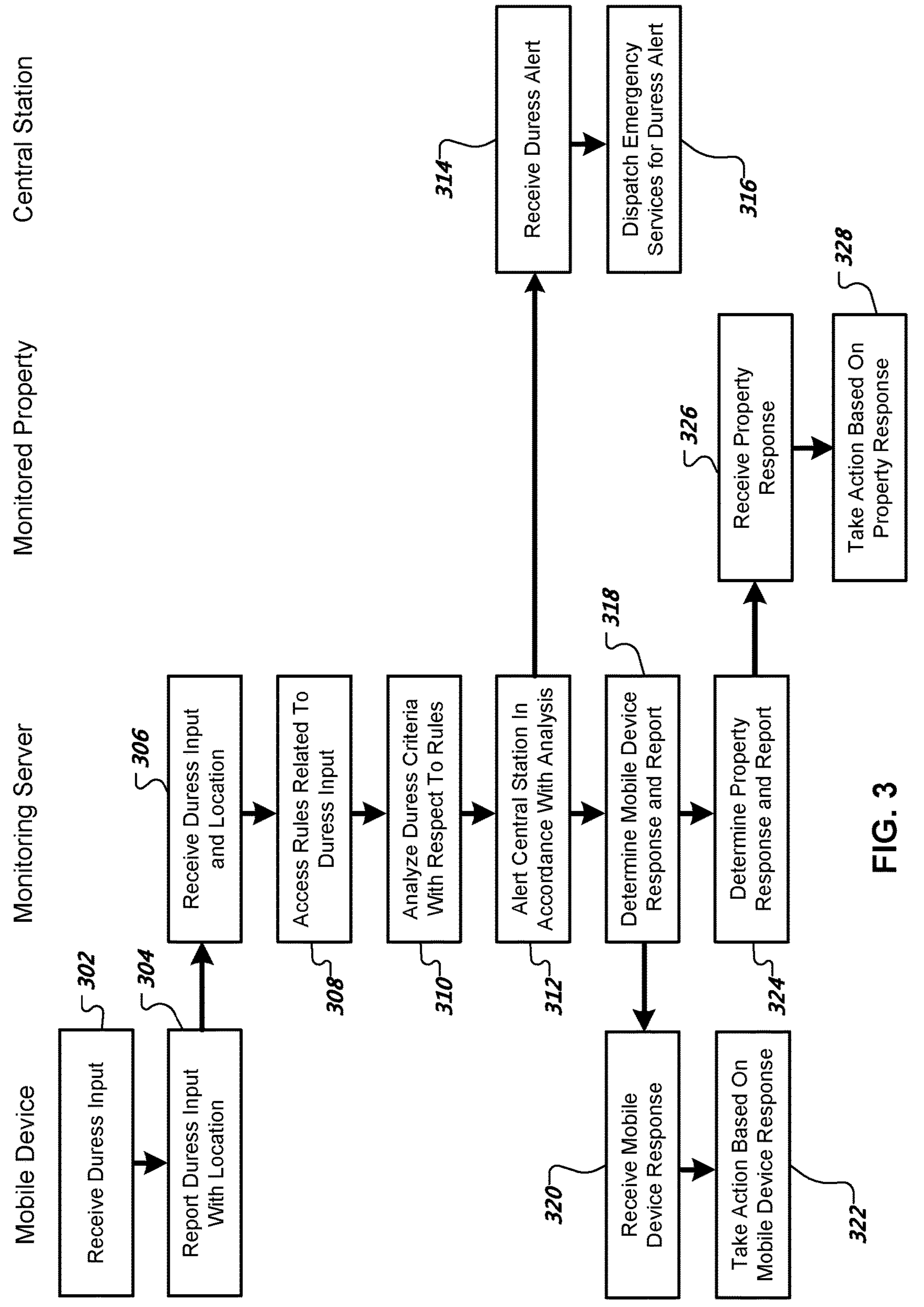
FIG. 3 is a flow chart of an example process.

FIG. 3 illustrates an example process 300 for handling duress input. The operations of the example process 300 are described generally as being performed by a mobile device, a monitoring server, a monitored property device, and a central station device. The operations of the example process 300 may be performed by one or more of the components of the system 200 (e.g., the monitoring system control unit 110, the one or more user devices 140, 150, the monitoring application server 160, and the central alarm station server 170). In some implementations, operations of the example processes may be performed by one or more processors included in one or more electronic devices.

The example process 300 begins when the mobile device receives duress input (302). For instance, the mobile device receives user input provided, by a user, to signify that the user is presently involved in a duress situation. The user input may be provided using any type of user input mechanism and may include an alphanumeric duress code, a particular gesture recognizable by the mobile device, a particular sequence of touch inputs provided to the mobile device, an audio duress phrase detected by the mobile device, or any other type of input that is capable of alerting the mobile device to a duress situation discreetly.

The mobile device reports the duress input with a location of the mobile device (304). For instance, the mobile device determines its current location (e.g., using GPS technology) and sends, the monitoring server, an electronic communication that indicates the duress input and the determined location of the mobile device.

The monitoring server receives, from the mobile device, the duress input and the location of the mobile device (306). For example, the monitoring server receives the electronic communication sent by the mobile device and interprets the electronic communication to recognize the duress input and the location of the mobile device.

The monitoring server accesses, from electronic storage, one or more rules related to duress input (308). For instance, the monitoring server accesses rules that define actions to be taken in response to duress input. The rules may specify duress parameters that are evaluated against to determine different types of actions to be taken based on the circumstances related to the duress input. The duress parameters may relate to the type of duress input provided, the timing of the duress input (e.g., date and/or time of day), the location where the duress input was provided, and the state of the property associated with the duress input (e.g., states of one or more sensors at the property). The rules may be specific to the user that provided the duress input or specific to the property associated with the duress input. The rules also may be configurable based on user input, which allows the user to define the actions to be taken in response to duress input in different circumstances.

The monitoring server analyzes duress criteria with respect to the one or more rules related to duress input (310). For example, the monitoring server determines duress criteria related to the circumstances of the current duress input and compares the duress criteria against the duress parameters defined by the accessed rules. In this example, the duress criteria may relate to the type of duress input provided, the timing of the duress input (e.g., date and/or time of day), the location where the duress input was provided, and the state of the property associated with the duress input (e.g., states of one or more sensors at the property) and the monitoring server may compare the duress criteria with the duress parameters to identify the action defined to be taken for the circumstances of the current duress input.

The monitoring server alerts a central station in accordance with the analysis (312). For instance, the monitoring server determines whether to alert the central station based on the analysis (e.g., the monitoring server may only alert the central station when the duress input is provided at the monitored property). Based on a determination to alert the central station, the monitoring server sends, to a central station device, an electronic communication that indicates the duress situation. The electronic communication may specify the user involved in the duress situation, a location of the duress situation, a location of the monitored property, any sensor data (e.g., image data, audio, motion or contact sensor values, etc.) relevant to the duress situation, or any other information relevant the assessment of the duress situation.

The central station device receives, from the monitoring server, a duress alert (314) and dispatches emergency services for the duress alert (316). For example, the central station device receives the electronic communication sent by the monitoring server and routes the electronic communication to a terminal of an operator assigned to handle the duress situation. In this example, the operator assesses the duress situation and contacts emergency services as appropriate. The central station device also may automatically contact emergency services based on the duress alert.

The monitoring server also determines a mobile device response to the duress input based on the analysis and reports the mobile device response to the mobile device (318). For instance, the monitoring server determines an action to be taken by the mobile device to assist in handling the duress situation and sends, to the mobile device, an electronic communication that identifies the action to be taken by the mobile device. The mobile device response may include any type of action described throughout this disclosure as being performed by a mobile device in response to a duress situation.

The mobile device receives, from the monitoring server, the mobile device response (320) and takes action based on the mobile device response (322). For example, the mobile device receives the electronic communication sent by the monitoring server and interprets one or more actions identified in the electronic communication. In this example, the mobile device then performs the one or more action interpreted from the electronic communication sent by the monitoring server.

The monitoring server further determines a monitored property response to the duress input based on the analysis and reports the monitored property response to the monitored property device (324). For instance, the monitoring server determines an action to be taken by the monitoring system at the monitored property to assist in handling the duress situation and sends, to the monitored property device, an electronic communication that identifies the action to be taken by the monitoring system at the monitored property. The monitored property response may include any type of action described throughout this disclosure as being performed by a monitoring system in response to a duress situation.

The monitored property device receives, from the monitoring server, the monitored property response (326) and takes action based on the monitored property response (328). For example, the monitored property device receives the electronic communication sent by the monitoring server and interprets one or more actions identified in the electronic communication. In this example, the monitored property device then performs the one or more actions interpreted from the electronic communication sent by the monitoring server.

Although FIG. 3 has been described with the monitoring server being a central decision making device that controls the mobile device and the monitored property device based on duress input, other arrangements are contemplated. For example, decision making in the process 300 may be distributed among the devices described in FIG. 3 and the control operations and communications may be altered in accordance with the distribution. In this example, the mobile device and the monitored property device may store one or more of the rules accessed by the monitoring server, the mobile device may determine the mobile device response itself, and the monitored property device may determine the monitored property response itself. In this regard, the monitoring server may simply relay the duress input to the relevant devices and the devices may determine the appropriate actions. Other arrangements and distribution of processing is possible and contemplated within the present disclosure.

FIG. 4 illustrates example rules for handling duress input. The example rules shown in FIG. 4 may be accessed in the process 300 and used to determine the mobile device response and the monitored property response. As shown, the example rules specify duress criteria 401-404, a mobile device response 405, and a monitored property response 406. The duress criteria define a type of duress input 401 provided to the mobile device, a location 402 of the mobile device that received the duress input, a date and/or time 403 when the duress input was received, and a monitored property status 404 when the duress input was received. The example rules 411-421 define various parameters for the duress criteria 401-404, a mobile device response 405 for the parameters, and a monitored property response 406 for the parameters. The example rules 411-421 may be customized by a user of the mobile device to enable different duress responses in accordance with different circumstances.

As shown, a first rule 411 defines the type of duress input 401 as being a first duress code, the location 402 as being away from home, the date and/or time 403 as being any, and the monitored property status 404 as being any. Thus, whenever the first duress code is provided to a mobile device that is located away from home, the first rule 411 defines the mobile device response 405 as denying the duress input and reporting an error and the first rule 411 defines the monitored property response 406 as maintaining an armed state of the monitoring system at the monitored property (e.g., home). In this regard, the first duress code is only valid to report a duress situation when the mobile device is located at the monitored property (e.g., home).

A second rule 412 defines the type of duress input 401 as being the first duress code, the location 402 as being at (or near) home, the date and/or time 403 as being any, and the monitored property status 404 as being occupied. Thus, whenever the first duress code is provided to a mobile device that is located at (or near) home at a time when the monitored property (e.g., home) is occupied, the second rule 412 defines the mobile device response 405 as outputting acceptance of the duress input and alerting a spouse and parent to the duress situation (e.g., by sending text messages, such as SMS messages, to the spouse and parent) and the second rule 412 defines the monitored property response 406 as disarming the monitoring system and turning on lights. In this regard, when the first duress code is provided to a mobile device that is located at (or near) home at a time when the monitored property (e.g., home) is occupied, the monitoring system attempts to help the users inside of the property by turning on lights to enhance visibility and sending alerts to people likely to occupy the property.

A third rule 413 defines the type of duress input 401 as being the first duress code, the location 402 as being at (or near) home, the date and/or time 403 as being any, and the monitored property status 404 as being unoccupied. Thus, whenever the first duress code is provided to a mobile device that is located at (or near) home at a time when the monitored property (e.g., home) is unoccupied, the third rule 413 defines the mobile device response 405 as outputting acceptance of the duress input and alerting a spouse to the duress situation (e.g., by sending text messages, such as SMS messages, to the spouse) and the third rule 413 defines the monitored property response 406 as disarming the monitoring system, turning off lights, and locking all Z-wave doors. In this regard, when the first duress code is provided to a mobile device that is located at (or near) home at a time when the monitored property (e.g., home) is unoccupied, the monitoring system attempts to make it difficult for potential intruders to navigate the monitored property by turning off lights to decrease visibility and locking doors.

A fourth rule 414 defines the type of duress input 401 as being audio duress input (e.g., a distress phrase detected based on audio captured by a microphone of the mobile device), the location 402 as being at (or near) home, the date and/or time 403 as being any, and the monitored property status 404 as being any. Thus, whenever the audio duress input is provided to a mobile device that is located at (or near) home, the fourth rule 414 defines the mobile device response 405 as monitoring accelerometer output to detect potential violence and capturing images and audio using input components (e.g., camera and microphone) of the mobile device and the fourth rule 414 defines the monitored property response 406 as capturing images and audio using input components (e.g., camera and microphone) in the monitored property and providing an alert (e.g., a siren) in the monitored property. In this regard, when the audio duress input is provided to a mobile device that is located at (or near) home, the mobile device and the monitoring system gather data useful in assessing the duress situation and/or identifying the potential attacker and the monitoring system alerts someone that is most likely to be in position to assist.

A fifth rule 415 defines the type of duress input 401 as being audio duress input (e.g., a distress phrase detected based on audio captured by a microphone of the mobile device), the location 402 as being away from home, the date and/or time 403 as being any, and the monitored property status 404 as being any. Thus, whenever the audio duress input is provided to a mobile device that is located away from home, the fifth rule 415 defines the mobile device response 405 as monitoring accelerometer output to detect potential violence, capturing images and audio using input components (e.g., camera and microphone) of the mobile device, and repeatedly reporting its location for tracking purposes and the fifth rule 415 defines the monitored property response 406 as providing an alert notification to a contact of the user that provided the audio duress input that is closet to a location of the mobile device. In this regard, when the audio duress input is provided to a mobile device that is located away from home, the mobile device gathers data useful in assessing the duress situation and/or identifying the potential attacker and the monitoring system alerts someone that is most likely to be in position to assist.

A sixth rule 416 defines the type of duress input 401 as being a “Z” gesture (e.g., a gesture provide to a touch screen of the mobile device in the shape of the letter Z), the location 402 as being any, the date and/or time 403 as being any, and the monitored property status 404 as being any. Thus, whenever the “Z” duress input is provided to a mobile device, the sixth rule 416 defines the mobile device response 405 as outputting acceptance of the duress input and the sixth rule 416 defines the monitored property response 406 as activating a siren at the monitored property and blinking the lights on and off. In this regard, when the “Z” duress input is provided to a mobile device, the monitoring system takes action to protect the monitored property by drawing attention to the monitored property and dissuading a potential burglar from entering the monitored property.

A seventh rule 417 defines the type of duress input 401 as being a second duress code that is different than the first duress code, the location 402 as being any, the date and/or time 403 as being some time from Monday through Friday, and the monitored property status 404 as being any. Thus, whenever the second duress code is provided to a mobile device some time from Monday through Friday, the seventh rule 417 defines the mobile device response 405 as outputting acceptance of the duress input and alerting a neighbor to the duress situation and the seventh rule 417 defines the monitored property response 406 as disarming the monitoring system and adjusting the thermostat to an extreme condition (e.g., heating the property to a high temperature during the summer or cooling the property to a low temperature during the winter). In this regard, when the second duress code is provided to a mobile device some time from Monday through Friday, the mobile device attempts to alert a person that is most likely to be able to provide assistance during the relevant time frame (e.g., the neighbor) and the monitoring system adjusts the thermostat in a manner that would make it uncomfortable for an intruder to spend a good deal of time at the monitored property.

An eighth rule 418 defines the type of duress input 401 as being the second duress code that is different than the first duress code, the location 402 as being any, the date and/or time 403 as being some time from Saturday through Sunday, and the monitored property status 404 as being any. Thus, whenever the second duress code is provided to a mobile device some time from Saturday through Sunday, the eighth rule 418 defines the mobile device response 405 as outputting acceptance of the duress input and alerting a spouse to the duress situation and the eighth rule 418 defines the monitored property response 406 as disarming the monitoring system and adjusting the thermostat to an extreme condition (e.g., heating the property to a high temperature during the summer or cooling the property to a low temperature during the winter). In this regard, when the second duress code is provided to a mobile device some time from Saturday through Sunday, the mobile device attempts to alert a person that is most likely to be able to provide assistance during the relevant time frame (e.g., the spouse) and the monitoring system adjusts the thermostat in a manner that would make it uncomfortable for an intruder to spend a good deal of time at the monitored property.

A ninth rule 419 defines the type of duress input 401 as being a third duress code that is different than the first duress code and the second duress code, the location 402 as being any, the date and/or time 403 as being between 8 AM and 8 PM, and the monitored property status 404 as being any. Thus, whenever the third duress code is provided to a mobile device between 8 AM and 8 PM, the ninth rule 419 defines the mobile device response 405 as outputting acceptance of the duress input and alerting a neighbor to the duress situation and the ninth rule 419 defines the monitored property response 406 as disarming the monitoring system and activating an alarm system of the neighbor (e.g., the neighbor uses the same alarm company as the user that provided the duress input and has agreed to allow the alarm company to activate its alarm between 8 AM and 8 PM during a duress situation to deter potential intruders at the user's property without making it apparent that the cause of the alarm is directly linked to the duress input). In this regard, when the third duress code is provided to a mobile device between 8 AM and 8 PM, the mobile device attempts to alert a person that is most likely to be able to provide assistance during the relevant time frame (e.g., the neighbor) and the monitoring system attempts to help the duress situation without alerting the potential intruders to the duress input.

A tenth rule 420 defines the type of duress input 401 as being the third duress code that is different than the first duress code and the second duress code, the location 402 as being any, the date and/or time 403 as being between 8 PM and 8 AM, and the monitored property status 404 as being any. Thus, whenever the second duress code is provided to a mobile device between 8 PM and 8 AM, the tenth rule 420 defines the mobile device response 405 as outputting acceptance of the duress input and alerting a spouse and parent to the duress situation and the tenth rule 420 defines the monitored property response 406 as disarming the monitoring system. In this regard, when the second duress code is provided to a mobile device between 8 PM and 8 AM, the mobile device attempts to alert a person that is most likely to be able to and willing to provide assistance during the relevant time frame (e.g., the spouse or parent).

An eleventh rule 421 defines the type of duress input 401 as being an Nth duress code that is different than the first duress code, the second duress code, and the third duress code, the location 402 as being any, the date and/or time 403 as being any, and the monitored property status 404 as being any. Thus, whenever the Nth duress code is provided to a mobile device, the eleventh rule 421 defines the mobile device response 405 as activating a delay sequence and the eleventh rule 421 defines the monitored property response 406 as delaying disarming the monitoring system in a manner tied to the delay sequence. The delay sequence may be any actions that delay the disarming of the monitoring system in a manner that does not jeopardize the safety of the user that provided the duress input. For example, when the Nth duress code is provided to the mobile device, the mobile device may initiate a facial recognition process (perhaps even a fake facial recognition process) to disarm the monitoring system and delays acceptance of a facial recognition match for a particular number of times (e.g., requires three attempts) or until a particular input is provided with a facial recognition input (e.g., a touch input provided to a corner of a touch screen while providing a facial image). In this example, the monitoring system does not disarm until the facial recognition match is reported or a threshold period of time (e.g., thirty seconds) after the facial recognition match is reported. The delay sequence introduces some delay to the duress situation to give first responders additional time to arrive at and assist in the duress situation.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:

receiving, by a device that controls one or more operations of a monitoring system at a property, user input that indicates a user providing the user input is involved in a duress situation; and in response to determining that the user input is a duress user input that indicates a user providing the duress user input is involved in a duress situation:

disarming the monitoring system or canceling an alarm of the monitoring system; and obtaining, by a microphone connected to the device, audio from the property that is different data from the duress user input.

2. The method of claim 1, comprising:

sending data indicating a second alarm to a central system in response to determining that the user input is a duress user input.

3. The method of claim 2, comprising:

in response to receiving data indicating the second alarm, causing dispatch of emergency services to a location of the property.

4. The method of claim 2, wherein disarming the monitoring system or canceling the alarm of the monitoring system occurs at least partially concurrently while sending the data indicating the second alarm to the central system.

5. The method of claim 3, wherein the data indicating the second alarm includes data indicating a location of the monitoring system for the dispatch of the emergency services.

6. The method of claim 1, comprising:
in response to disarming the monitoring system or canceling the alarm of the monitoring system, presenting, using an interface of the device, an indication that the monitoring system has been disarmed or the alarm has been canceled.

7. The method of claim 1, wherein the user input includes one or more of a passcode, gesture, or biometric input.

8. The method of claim 1, wherein the device that controls one or more operations of the monitoring system is located at the property.

9. The method of claim 1, comprising:
in response to determining that the user input is a duress user input, providing the obtained audio to an operator device to assess the duress situation at the property.

10. The method of claim 1, wherein obtaining the audio comprises:
obtaining the audio for a threshold period of time to assist with the duress situation at the property.

11. The method of claim 10, wherein the threshold period of time is 30 seconds.

12. The method of claim 1, comprising:
in response to determining that the user input is a duress user input, determining, using one or more rules and data for the duress user input and from a plurality of actions, to (i) disarm the monitoring system or cancel the alarm of the monitoring system and (ii) obtain the audio from the property,
wherein disarming the monitoring system or canceling an alarm of the monitoring system and obtaining, by a microphone connected to the device, audio data for the property are responsive to determining, using the one or more rules and the data for the duress user input and from a plurality of actions, to (i) disarm the monitoring system or cancel the alarm of the monitoring system and (ii) obtain the audio data.

13. A method comprising:
receiving, by a system that communicates with a monitoring system at a property, user input that indicates a user providing the user input is involved in a duress situation; and
in response to determining that the user input is a duress user input that indicates a user providing the duress user input is involved in a duress situation, sending, to a device for the monitoring system, a command to cause the device to capture audio that is different data from the duress user input;
receiving, from the device, the audio; and
providing at least a portion of the audio for presentation.

14. The method of claim 13, wherein providing at least the portion of the audio for presentation comprises:
sending the portion of the audio to a terminal of an operator assigned to handle the duress situation.

15. The method of claim 13, comprising:
contacting emergency services in response to determining that the user input is a duress user input.

16. The method of claim 13, comprising:
in response to determining that the user input is a duress user input, sending, to the device for the monitoring system, a command to disarm the monitoring system or cancel an alarm of the monitoring system.

17. The method of claim 13, comprising:
in response to determining that the user input is a duress user input, sending, to the device for the monitoring system, a command to present, using an interface of the device, an indication that the monitoring system has been disarmed or an alarm has been canceled.

18. The method of claim 13, comprising:
providing information related to the monitoring system to a contact of the user.

19. A system comprising one or more computers and one or more storage devices on which are stored instructions that are operable, when executed by the one or more computers, to cause the one or more computers to perform operations comprising:
receiving, by a device that controls one or more operations of a monitoring system at a property, user input that indicates a user providing the user input is involved in a duress situation; and
in response to and after determining that the user input is a duress user input that indicates a user providing the duress user input is involved in a duress situation:
disarming the monitoring system or canceling an alarm of the monitoring system; and
obtaining, by a sensor connected to the device, sensor data for the property, where the sensor data is different data from the duress user input.

20. The system of claim 19, wherein the sensor comprises a camera or a microphone.

* * * * *